United States Patent
Davies

(10) Patent No.: US 7,890,797 B2
(45) Date of Patent: *Feb. 15, 2011

(54) VEHICLE INCLUDING A PROCESSOR SYSTEM HAVING FAULT TOLERANCE

(75) Inventor: Steven P. Davies, Ontario, CA (US)

(73) Assignee: Raytheon Company, Waltham, MA (US)

( * ) Notice: Subject to any disclaimer, the term of this patent is extended or adjusted under 35 U.S.C. 154(b) by 910 days.

This patent is subject to a terminal disclaimer.

(21) Appl. No.: 11/764,965

(22) Filed: Jun. 19, 2007

(65) Prior Publication Data

US 2007/0240028 A1    Oct. 11, 2007

Related U.S. Application Data

(62) Division of application No. 11/198,198, filed on Aug. 5, 2005, now Pat. No. 7,272,681.

(51) Int. Cl.
*G06F 11/00* (2006.01)

(52) U.S. Cl. .............................. 714/10; 710/311; 701/33

(58) Field of Classification Search ................... 714/10; 710/311; 701/33
See application file for complete search history.

(56) References Cited

U.S. PATENT DOCUMENTS

| | | | |
|---|---|---|---|
| 6,141,769 A | 10/2000 | Petivan et al. | |
| 6,148,348 A | 11/2000 | Garnett et al. | |
| 6,792,560 B2 | 9/2004 | Francis et al. | |
| 6,839,868 B1 | 1/2005 | Pignol | |
| 6,895,582 B1 | 5/2005 | Greve | |
| 6,915,444 B2 | 7/2005 | Vasko et al. | |
| 6,948,092 B2 | 9/2005 | Kondo et al. | |
| 7,107,358 B2 | 9/2006 | Vasko et al. | |
| 7,272,681 B2 * | 9/2007 | Davies | 710/311 |
| 7,546,487 B2 * | 6/2009 | Marisetty et al. | 714/27 |
| 7,627,540 B2 * | 12/2009 | Snook et al. | 706/15 |
| 7,725,215 B2 * | 5/2010 | Stange et al. | 701/1 |
| 7,765,427 B2 * | 7/2010 | Stange et al. | 714/10 |
| 2006/0010006 A1 * | 1/2006 | Kreidler et al. | 705/1 |
| 2006/0106506 A1 * | 5/2006 | Nichols et al. | 701/3 |
| 2006/0149582 A1 * | 7/2006 | Hawkins | 705/1 |
| 2006/0287780 A1 | 12/2006 | Hutton | |
| 2007/0033511 A1 | 2/2007 | Davies | |
| 2007/0094481 A1 * | 4/2007 | Snook et al. | 712/200 |
| 2007/0106432 A1 * | 5/2007 | Jones et al. | 701/3 |
| 2007/0129826 A1 * | 6/2007 | Kreidler et al. | 700/83 |
| 2007/0135975 A1 * | 6/2007 | Stange et al. | 701/3 |
| 2008/0133074 A1 * | 6/2008 | Zyss et al. | 701/16 |

OTHER PUBLICATIONS

"A methodology for the rapid injection of transient hardware errors" by Yount et al. (abstract only) Publication Date: Aug. 1996.

* cited by examiner

*Primary Examiner*—M. Mujtaba K Chaudry
(74) *Attorney, Agent, or Firm*—Daly, Crowley, Mofford & Durkee, LLP

(57) ABSTRACT

A vehicle includes a high assurance processing system including a plurality of data processors coupled in parallel, a bridge coupled to the input/output processor, and an input/output processor coupled to the bridge for coupling to a sensor and an effector. Sensor data passes to the bridge through the input/output processor for processing by the parallel data processors, which generate redundant effector data for comparison by the bridge to detect errors. If data matches are found, data is transmitted to the effector.

20 Claims, 8 Drawing Sheets

VEHICLE INCLUDING A PROCESSOR SYSTEM HAVING FAULT TOLERANCE

CROSS REFERENCE TO RELATED APPLICATIONS

The present application is a divisional patent application of U.S. patent application Ser. No. 11/198,198, filed on Aug. 5, 2005, now U.S. Pat. No. 7,272,681 which is incorporated herein by reference.

STATEMENT REGARDING FEDERALLY SPONSORED RESEARCH

Not Applicable.

BACKGROUND OF THE INVENTION

As known in the art, for safety of life applications, such as aircraft navigation and flight control systems, there is a need for system processing with a high assurance that actions presenting an unacceptable risk to safe operation are not induced by hardware faults. While numerous conventional designs have met these stringent requirements, they often do so with severe restrictions on processor input/output or require specialized processor hardware that poses life cycle support problems. For example, some known computing systems either use special purpose processing modules that support tightly coupled voting schemes and/or rely upon relatively low bandwidth cross-channel serial links for integrity checks. With the first approach technology refresh is hampered by the need to redesign and recertify complex processor circuitry in order to upgrade the processor technology. With the second approach the number of cross-channel serial links necessary to support high bandwidth input and output becomes prohibitive.

SUMMARY OF THE INVENTION

The present invention provides a high assurance processing system having a bridge located between an input/output processor and a plurality of parallel data processors. With this arrangement, faults can be identified by the bridge by comparing information from the data processors so that actions posing an unacceptable risk to life are not implemented. While the invention is primarily described in conjunction with navigation sensors and effectors for an aircraft, it is understood that the invention is applicable to any vehicle or system in which is desirable to prevent actions posing an unacceptable risk to safe operation.

In one aspect of the invention, a processing system includes a plurality of data processors coupled in parallel, a bridge coupled to the input/output processor, and an input/output processor coupled to the bridge. The input/output processor can receive sensor data and send effector data. The sensor data passes to the bridge through the input/output processor for processing by the data processors, which generate redundant effector data for comparison by the bridge to detect errors or faults. The checked data is then transmitted to the effector.

In another aspect of the invention, a method includes receiving data from a sensor at an input/output processor, receiving the sensor data from the input/output processor at a bridge, and receiving and processing the sensor data at a plurality of data processors coupled in parallel. The method further includes comparing data from the plurality of data processors to identify errors, transmitting the data from the bridge to the input/output processor, and transmitting the data from the input/output processor to an effector.

In another aspect of the invention, the input/output processor and/or data processors are provided as commercial off the shelf components. In a further aspect of the invention, at least one bus coupled to the bridge is provided as an open standard interface bus. With this arrangement, special purpose processing modules having tightly coupled voting schemes are not needed so that systems can be readily upgraded, refreshed, and the like.

BRIEF DESCRIPTION OF THE DRAWINGS

The invention will be more fully understood from the following detailed description taken in conjunction with the accompanying drawings, in which.

DETAILED DESCRIPTION OF THE INVENTION

In general, the present invention provides method and apparatus to achieve high assurance processing using multiple loosely synchronized processors, which can be provided as Commercial off the Shelf (COTS) processors, communicating via an open standard bus interface, for example. In one embodiment, synchronization and voting logic is implemented as an open standard compliant bus bridge with an input/output processor on one side of the bridge and multiple data processors on the other side of the bridge. The bridge functions such that the input/output processor communicates with the data processors in parallel as if there was a single data processor. In one particular embodiment, the bridge generates an input/output bus exception if there is not agreement between a predetermined number of data processors to achieve the required level of assurance. The bridge can be implemented, for example, as an active backplane with COTS processor cards or as a standard compliant carrier card with COTS processor mezzanine modules as data processors to maximize the utilization of COTS products.

Figure 1:
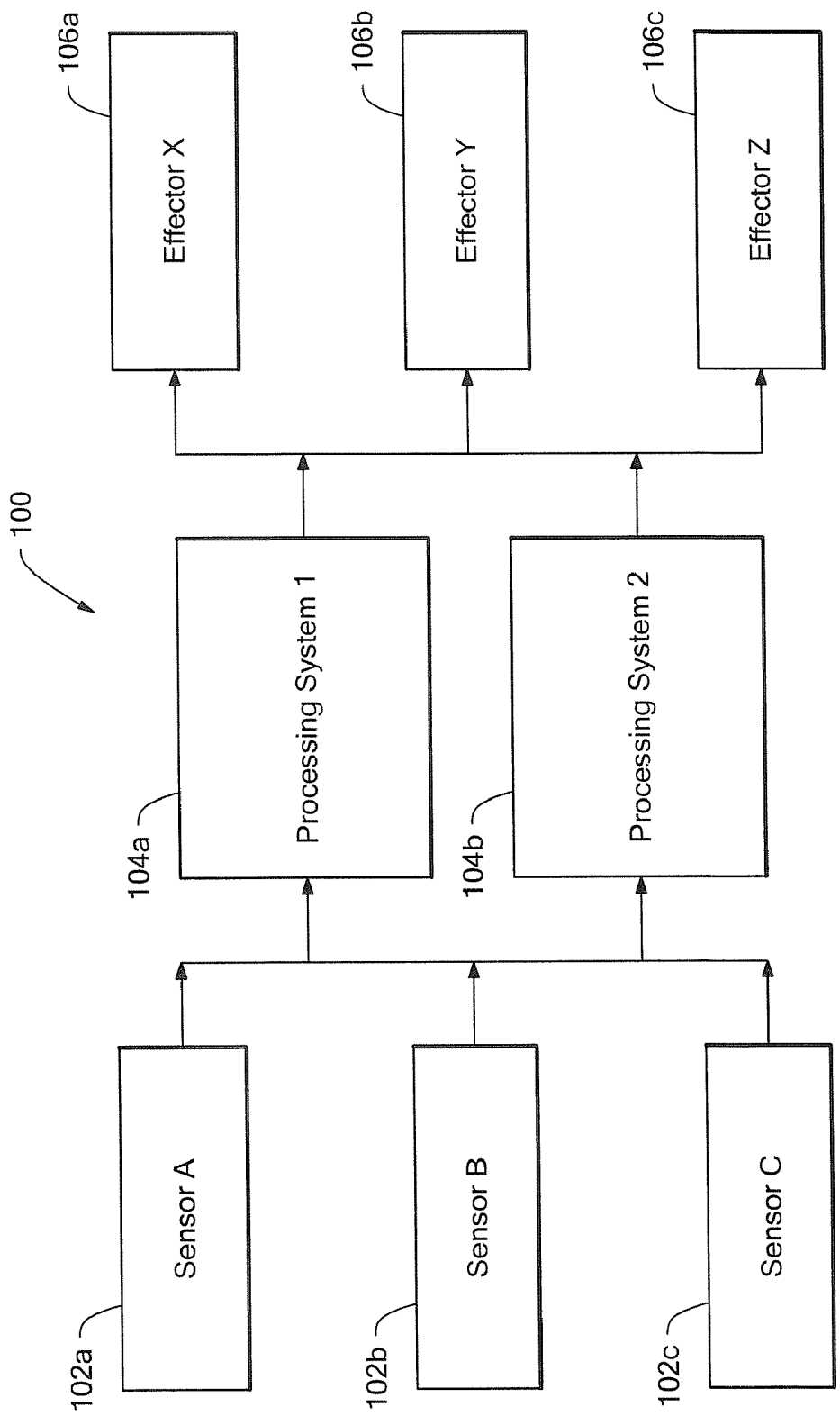
FIG. 1 is a block diagram of a high assurance system in accordance with the present invention

FIG. 1 shows an exemplary system 100 providing safety of life including first, second and third sensors 102a, b, c coupled to first and second processing systems 104a, b, which are coupled to first, second, and third effectors 106a, b, c. The sensors 102 provide data to the processing systems 104 to control the effectors 106. In one particular embodiment, the sensors 102 are navigation sensors and the effectors 106 are flight control effectors. It is understood that any number of sensors, effectors, and processing systems can be used to meet the requirements of a particular application.

As used herein, high assurance is defined as: the system continues to function correctly and reliably in the presence of hardware faults. In the context of the current invention this translates to there must be an uncorrupted data path from the sensors to the effectors and data that is corrupted due to a hardware fault must be prevented from being used by effectors. In general, faults can occur in the sensors, in transferring data from the sensors to the processing system, within the processing system, in transferring data to the effectors, and in the effectors.

Redundancy and comparison can be used to detect some classes of faults. With multiple sensors it may be possible to check for consistency between sensors to detect a fault in a sensor. Parity or Cyclic Redundancy Check (CRC) check bits may be used to detect data that has changed during transit or storage. A digital signature may be used to authenticate that data is from the intended source. Within the processing system it may be possible to do the same processing in independent parallel processors and compare the results to detect faults in a processor. Closed loop feedback may be used to determine if an effector took the appropriate action.

Figure 2:
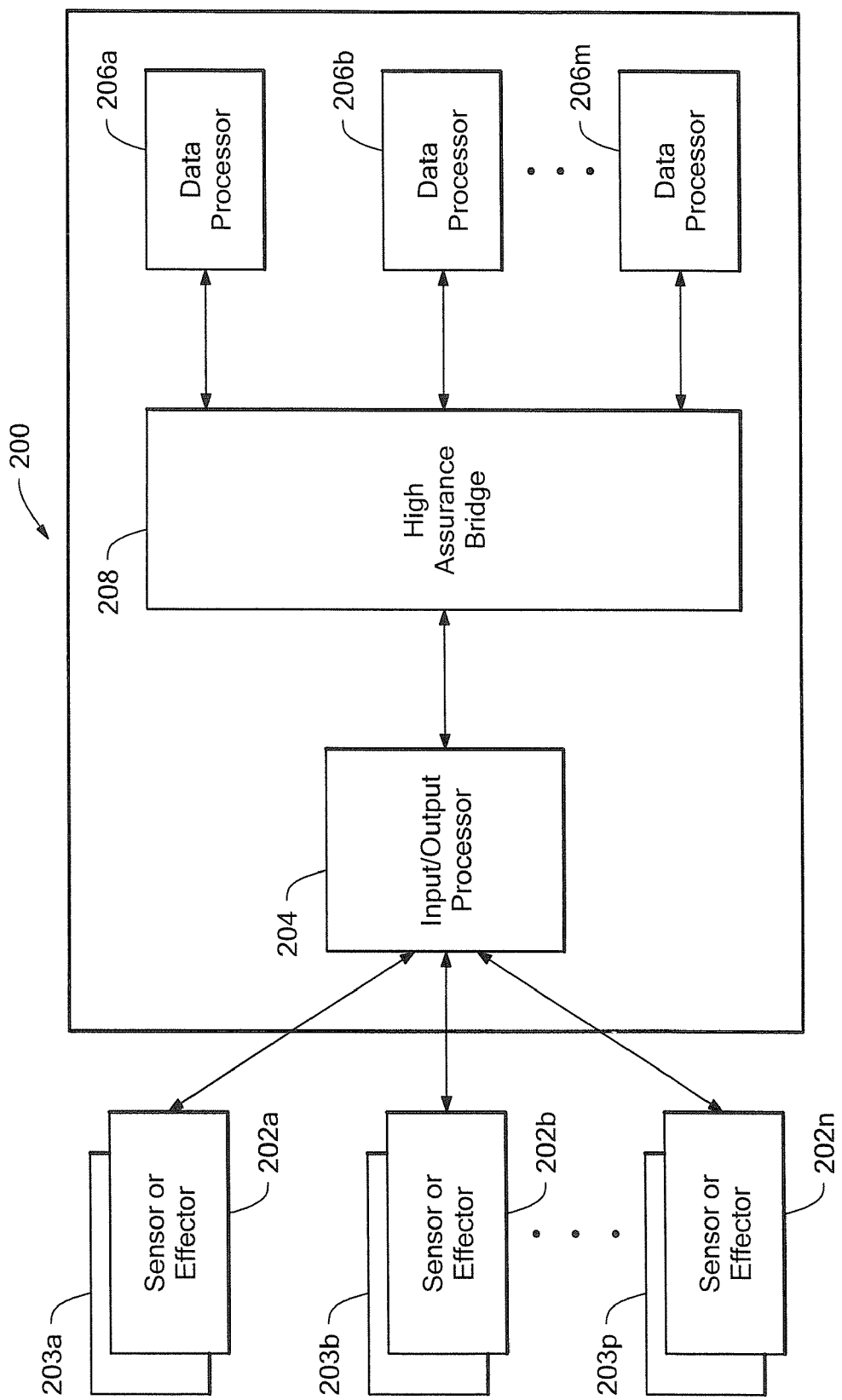
FIG. 2 is a block diagram of a high assurance processing system having a bridge in accordance with the present invention.

Detecting that some intermediate result may have been corrupted by a fault is part of the problem. Another part of the problem is to ensure that, if necessary, the system can continue operating after detection of a fault. Redundancy with failover can be used to operate through some classes of failures. A single processing system may employ triple modular redundancy to be able to continue operating after detecting a fault in one module such as depicted in FIG. 2 when configured with three data processors. Alternately, a dual-dual architecture may be used where each of two processing systems is dual redundant so if one processing system detects a fault, operation can roll over to the other processing system such as depicted in FIG. 1 when each processing system is configured with two data processors. A combination of these techniques may be applied at different levels to achieve the requisite system level of assurance. The present invention is applicable to each of these approaches and others, as described more fully below.

FIG. 2 shows a high assurance processing system 200 coupled to a number of sensors 202a-n and effectors 203a-p. The processing system 200 includes an interface to the sensors 202 and effectors 203 provided as an input/output processor 204 through which data from the sensors and to the effectors passes. It is understood that the sensors/effectors 202, 203 can be the same or different devices. Safety critical processing is performed in parallel by a series of data processors 206a-m to which sensor data is passed in parallel through a high assurance bridge 208. In an exemplary embodiment, the input/output processor 204 and/or data processors 206 are provided as COTS processors. The high assurance bridge 208 can be coupled to the input/output processor 204 and/or the data processors 206 via open standard buses. Suitable processor systems include Pentium® or PowerPC® based processor boards for VMEbus™, PCI, or CompactPCI buses that can be used in embodiments of the invention.

In an exemplary embodiment, before the data processors 206 use any external data, such as from the sensors 202, the data processors 206 should perform an integrity check to verify the data has not been corrupted in transit or storage. Depending on the level of assurance required, the integrity check can range from a bounds check on raw sensor data to parity or CRC verification on a word or block of data to verification of a digital signature to authenticate the source of the data. Similarly, the data processors 206 may add parity, CRC bits, or a digital signature to data that is going to be output from the data processor.

After the data has been processed, control data for the effectors 203 is passed from the data processors 206 through the high assurance bridge 208 to the input/output processor 204. When data is passed from the data processors 206 to the input/output processor 204, the high assurance bridge 208 compares data between pairs of data processors and passes only matching data to the input/output processor 204. The input/output processor 204 sends the results to the effectors 203. The effectors 203 can check parity, CRC, or a digital signature before using any data from the data processors 206 to verify the data was not corrupted in transit or storage.

Figure 3:
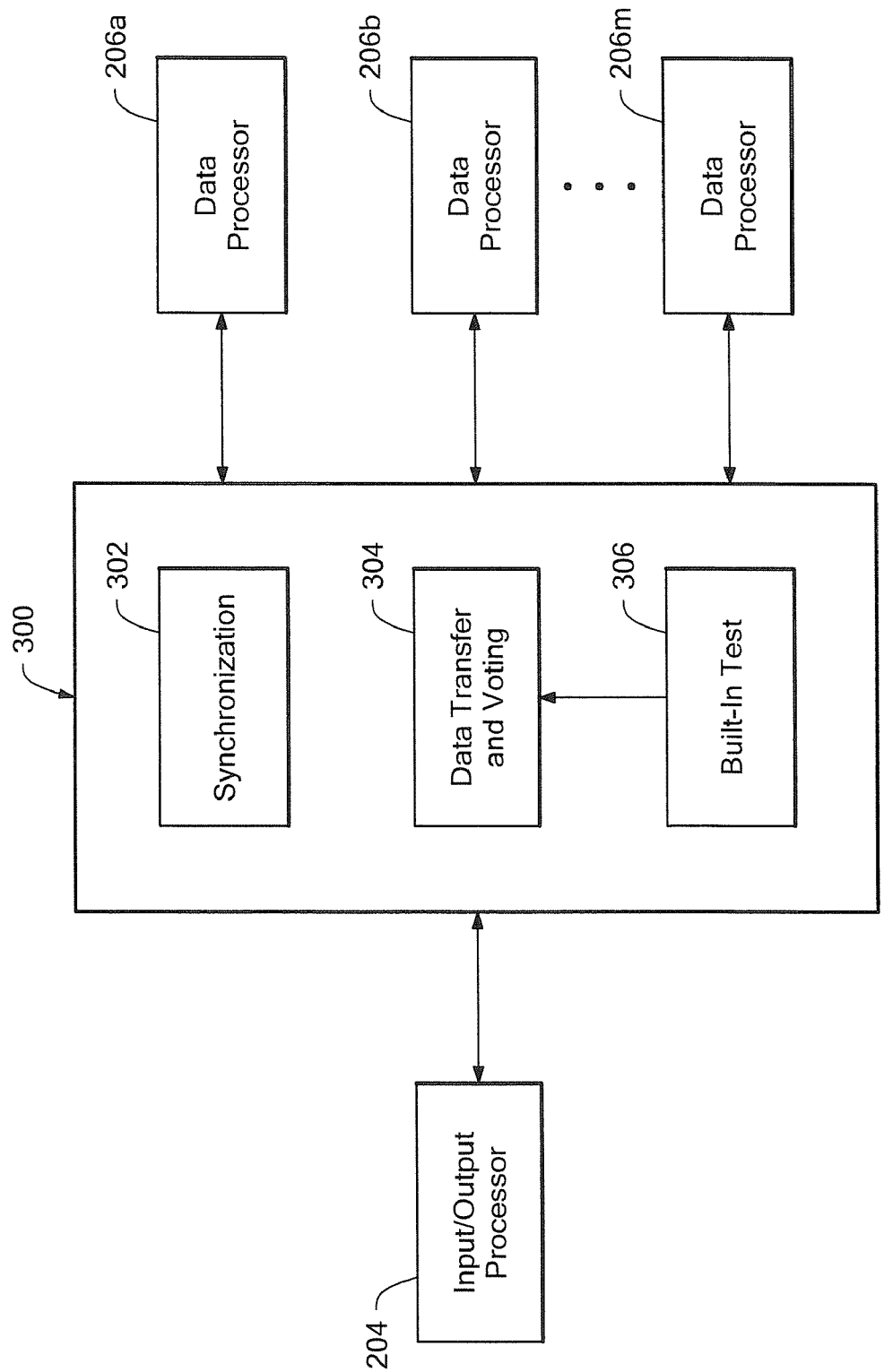
FIG. 3 is a block diagram of a bridge that can form a part of a high assurance processing system in accordance with the present invention.

FIG. 3 shows an exemplary high assurance bridge 300 in accordance with an illustrative embodiment of the present invention. The bridge 300 includes a synchronization module 302, a data transfer and voting module 304, and an optional built-in test (BIT) module 306. In one embodiment, it is possible there will be timing variations between the data processors 206a, b, m since they are not operating in lockstep. Synchronization between the input/output processor 204 and the parallel data processors 206 is maintained through the synchronization module 302, as discussed more fully below. The data transfer and voting module 304 performs the data transfer and checks for consistency between the data processors 206. The built-in test module 306 injects test patterns to verify the integrity of the data transfer and voting function.

Figure 4:
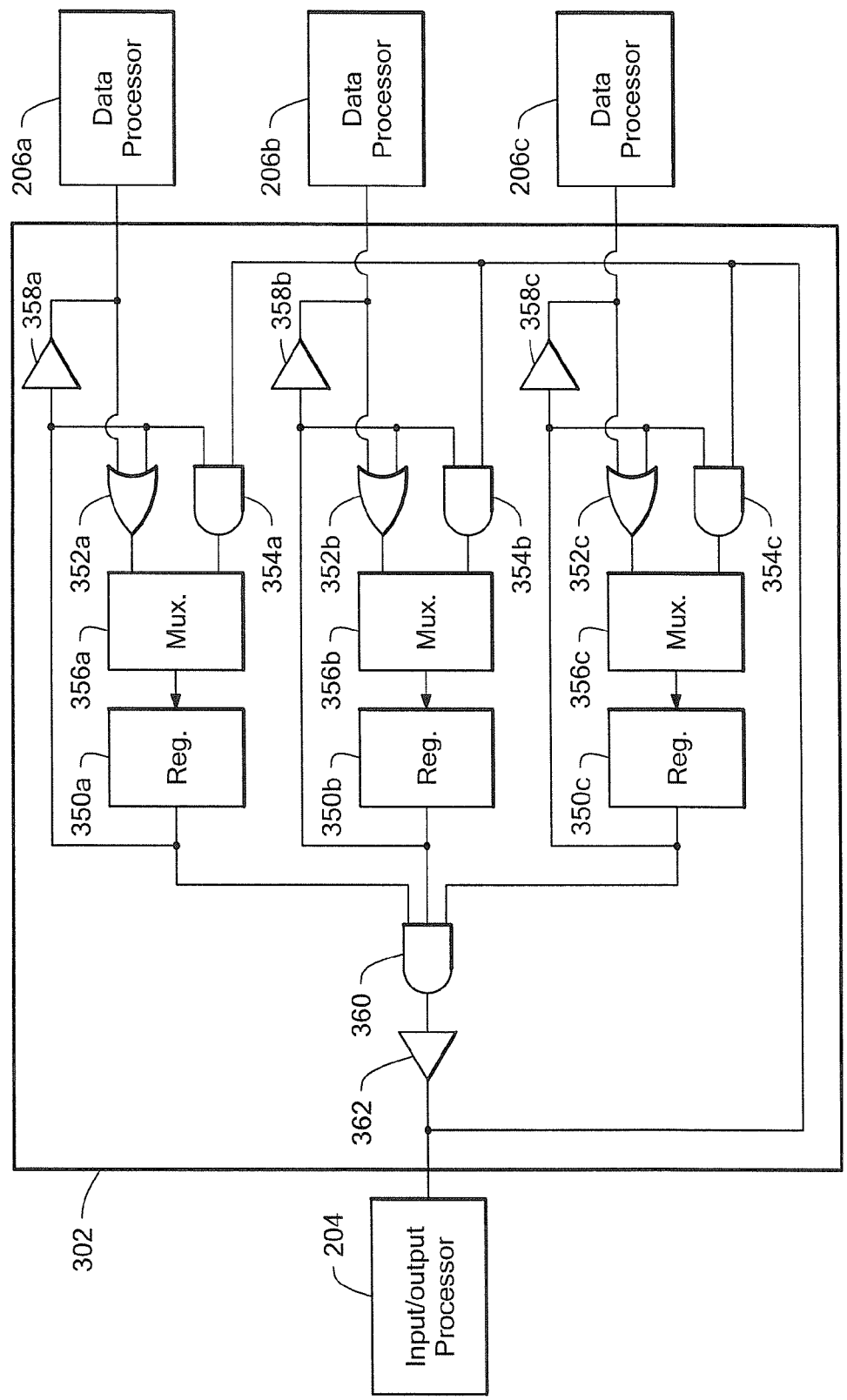
FIG. 4 is a block diagram showing an exemplary implementation of a synchronization module that can form a part of the bridge of FIG. 3.

FIG. 4 shows an exemplary implementation of the synchronization module 302 of FIG. 3. In general, the synchronization module 302 maintains a set of semaphores shared between the input/output processor 204 and the parallel data processors 206a, b, c. For each semaphore there is a separate bit in a register 350a-c for each of the data processors 206. The data processors 206 can independently test and set their semaphore register bits through read and write bus cycles addressed to a semaphore.

In the illustrated embodiment, a series of registers 350a, b, c, one for each data processor 206a, b, c, hold the semaphore register bits. Logical OR gates 352a, b, c, and logical AND gates 354a, b, c, provide inputs to respective multiplexers 356a, b, c that provide inputs to the respective registers 350. The data processors 206a, b, c, read the semaphore register bits via respective buffers 358a, b, c. Register 350 outputs are provided to an AND gate 360, which provides an output to a buffer 362 coupled to the input/output processor 204.

In the illustrative implementation, each data processor 206 can read register bits through the corresponding buffer 358a-c. To set register bits, the data processor 206 loads a logical OR of the register content and data from the data processor through the corresponding OR gate 352a-c. A logical ONE in the data processor data 206 sets the corresponding semaphore bit in the register 350. The input/output processor 204 can test and clear semaphore registers 350 also through read and write bus cycles addressed to a semaphore. When the input/output processor 204 tests a semaphore it gets the value of the corresponding semaphore register bits from each of the data processors 206. These individual bits can be masked and combined in either hardware or software to produce a composite semaphore bit for all enabled data processors.

The illustrated embodiment shows a hardware implementation of combining the register bits with the output of AND gate 360 read through buffer 362. The inputs to the AND gate 360 need to be masked to ignore disabled input/output processors if input/output processors are individually enabled or disabled. When the input/output processor 204 clears a semaphore each of the corresponding semaphore register bits for all data processors is cleared. In this implementation the multiplexer selection logic for all data processors loads a logical AND of the register content 350 and data from the input/output processor 206 through the AND gates 354a, b, c. A logical ZERO in the input/output processor data clears the corresponding semaphore bit. If supported by the open standard bus protocol, for example, the synchronization module 302 may generate an interrupt to the input/output processor or data processors when the state of a semaphore changes.

Figure 5:
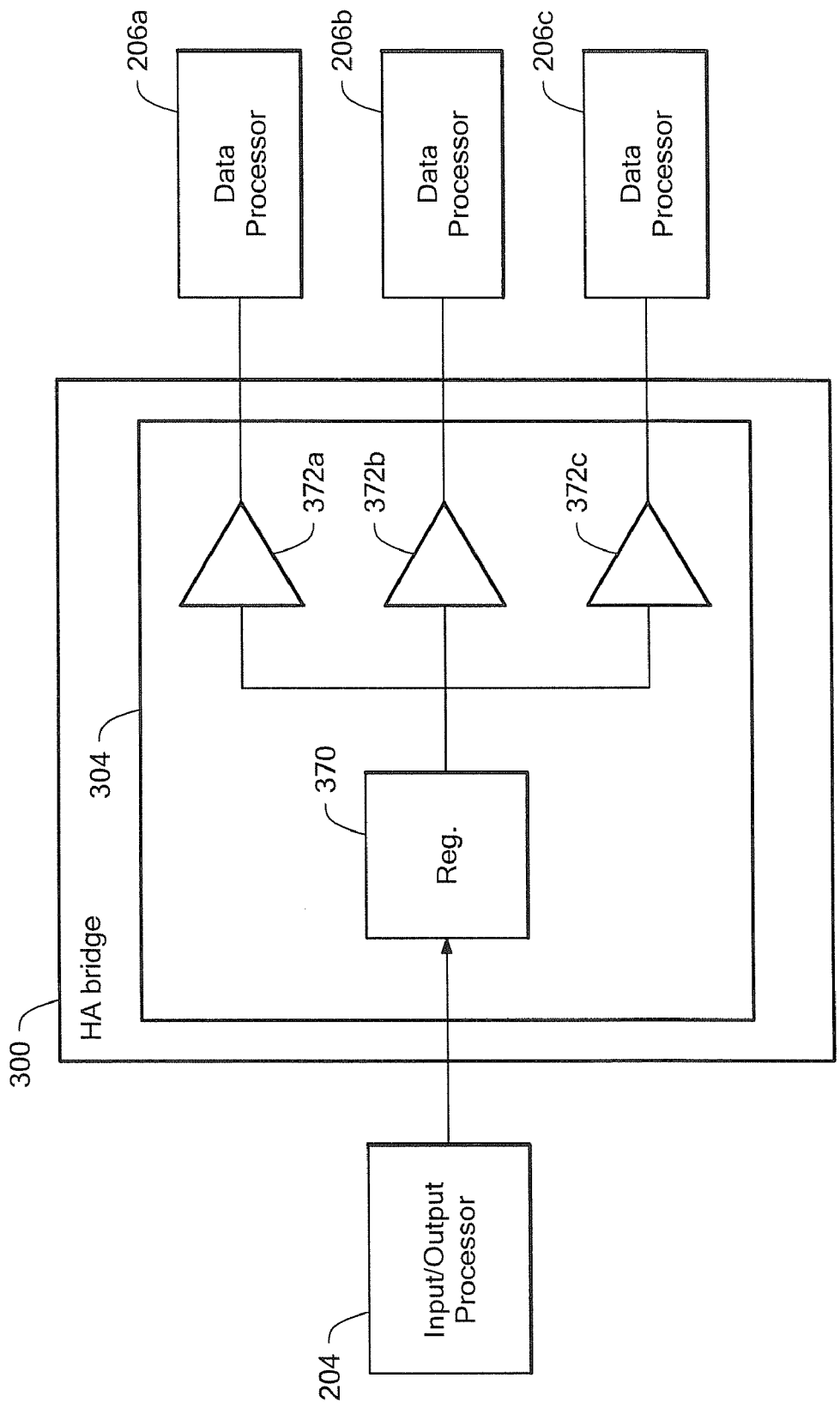
FIG. 5 is a block diagram showing an exemplary implementation of a data transfer and voting module that can form a part of the bridge of FIG. 3.

FIG. 5 shows an exemplary implementation of a data transfer and voting module 304 in the bridge 300 for receiving data, e.g., sensor data. As described above, data transfers between the input/output processor 204 and the parallel data processors 206 are initiated from the input/output processor side of the high assurance bridge 300. Data from the input/output processor 204 is captured in a register 370. The bridge 300 initiates a data bus cycle with active ones of the parallel data processors 206 enabled. At the appropriate time, the bridge 300 enables respective buffers 372a, b, c to send the registered data to the data processors 206. Once the enabled data processors have completed the data transfer, the high assurance bridge completes the corresponding transfer with the input/output processor 204.

Figure 6:
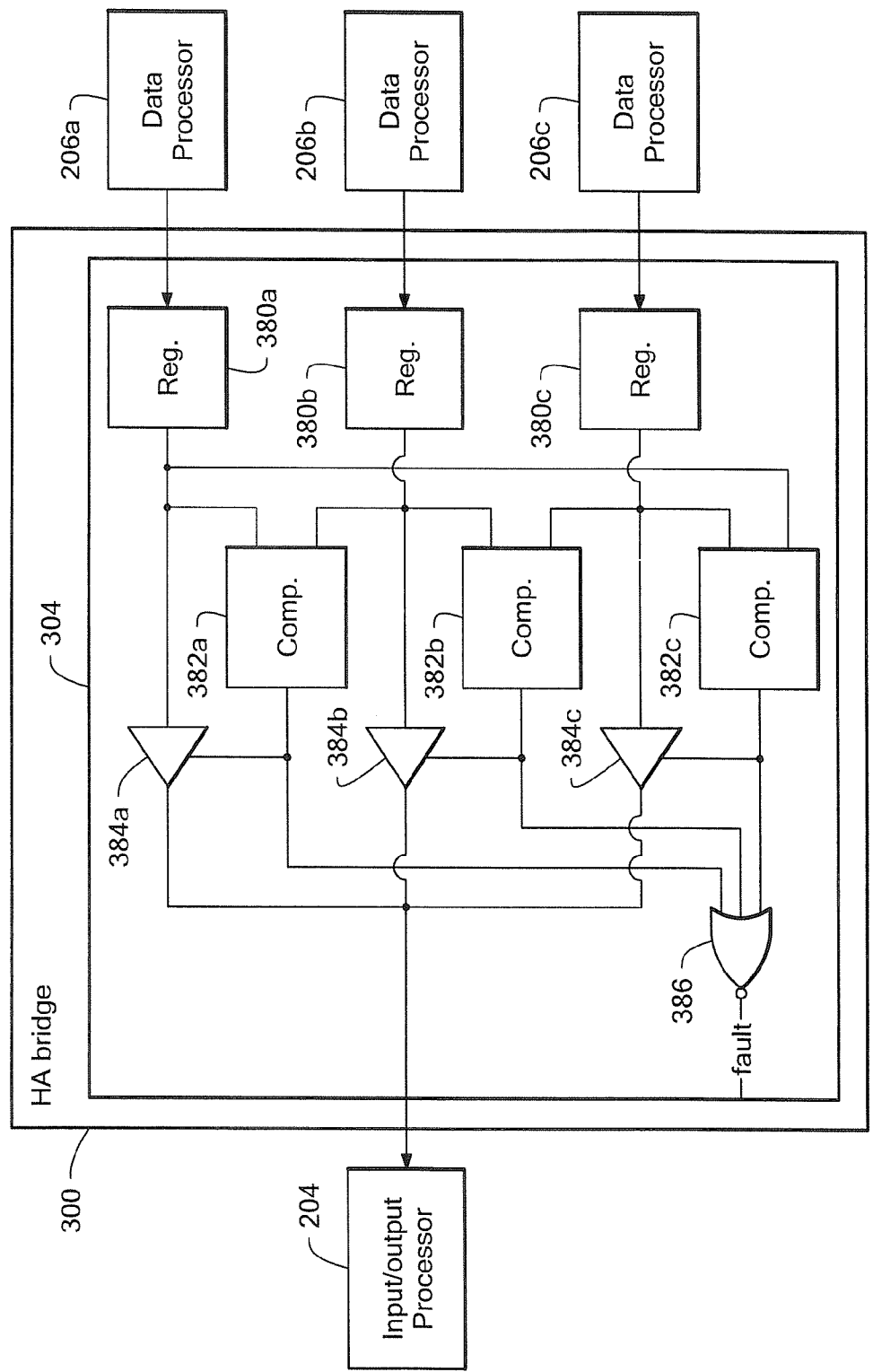
FIG. 6 is a further block diagram of an exemplary implementation of a data transfer and voting module that can form a part of the bridge of FIG. 3.

FIG. 6 shows how data is passed from the data processors 206 to the input/output processor 204. When the input/output processor 204 makes a data request, the high assurance bridge 300 initiates a bus cycle with the enabled data processors 206, which are in parallel. At the appropriate time, the bridge clocks data registers 380a, b, c to capture the data from the data processors 206. Once the enabled data processors have completed the data transfer, the bridge 300 compares data in pairs of data processors in comparators 382a, b, c. If at least one data comparison indicates a data match, the bridge enables the corresponding buffers 384a, b, c at the appropriate time. If there were no matches the high assurance bridge generates a bus exception for the input/output processor 204 through a gate 386, shown as an NOR gate. The inputs to the gate 386 can be masked to ignore disabled input/output processors if input/output processors are individually enabled or disabled.

In other embodiments, a predetermined number of successful comparisons can be required to meet the assurance requirements for a particular application. For example, to achieve a particular high assurance level, three of three successful comparisons must be made.

Figure 7:
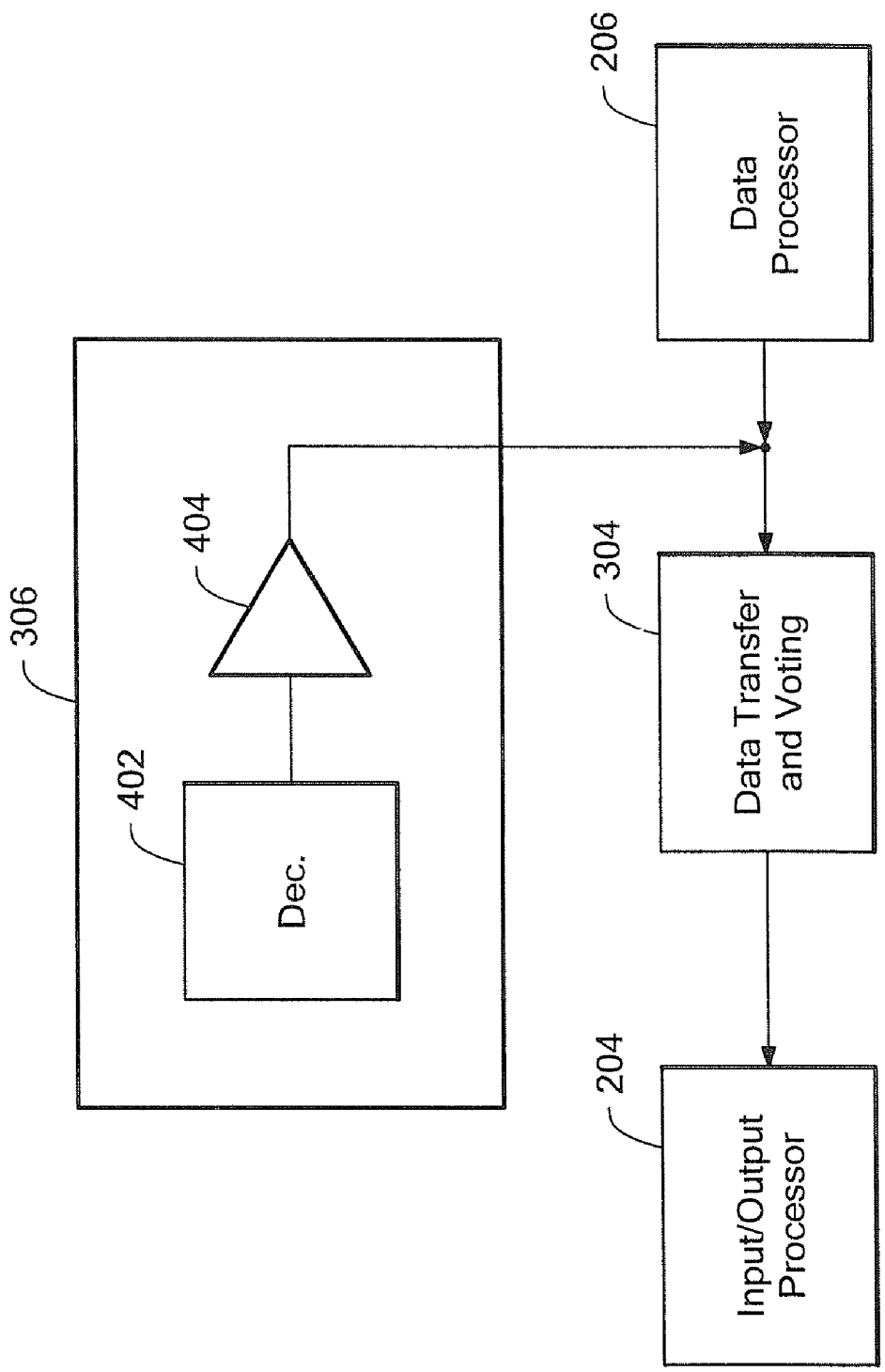
FIG. 7 is a block diagram of an exemplary built in test module that can form a part of the bridge of FIG. 3.

FIG. 7 shows an exemplary configuration for the Built-In-Test (BIT) module 306 of FIG. 3. The optional BIT module 306 is useful to maintain a high level of assurance by periodically testing the data transfer and voting logic to ensure it is functioning properly. Testing should verify that any mismatches would be caught by the voting logic.

FIG. 7 shows a block diagram for a single data processor 206 and would be duplicated for each data processor 206. The BIT module 306 includes a decoder 402 and a buffer 404 to selectively provide data from the decoder 402 to the data transfer and voting 304 inputs in place of the data processor 206 outputs. When the input/output processor 204 (FIG. 3) initiates a bus cycle the high assurance bridge 300 decodes the address to determine the target of the bus cycle. If the address decoding indicates the target is the built-in test module 306, the decoder 402 uses the low order bits of the address and a unique data processor bus number to generate a test pattern for injection at the input of the data transfer and voting 304 via the buffer 404. This can be done in parallel for enabled data processors 206 with one of the decoders generating a different data pattern than the other decoders based on the unique data processor bus number. This test pattern data is processed as if it was a 'normal' data processor 206 to input/output processor 204 data transfer.

In one embodiment, software running in the input/output processor 204 flags a fault if any of the test patterns fail to produce a bus exception. A watch dog timer in the high assurance bridge 300 sends an interrupt to the input/output processor 204 if it does not sequence through all of the test patterns within a predetermined period of time.

Figure 8:
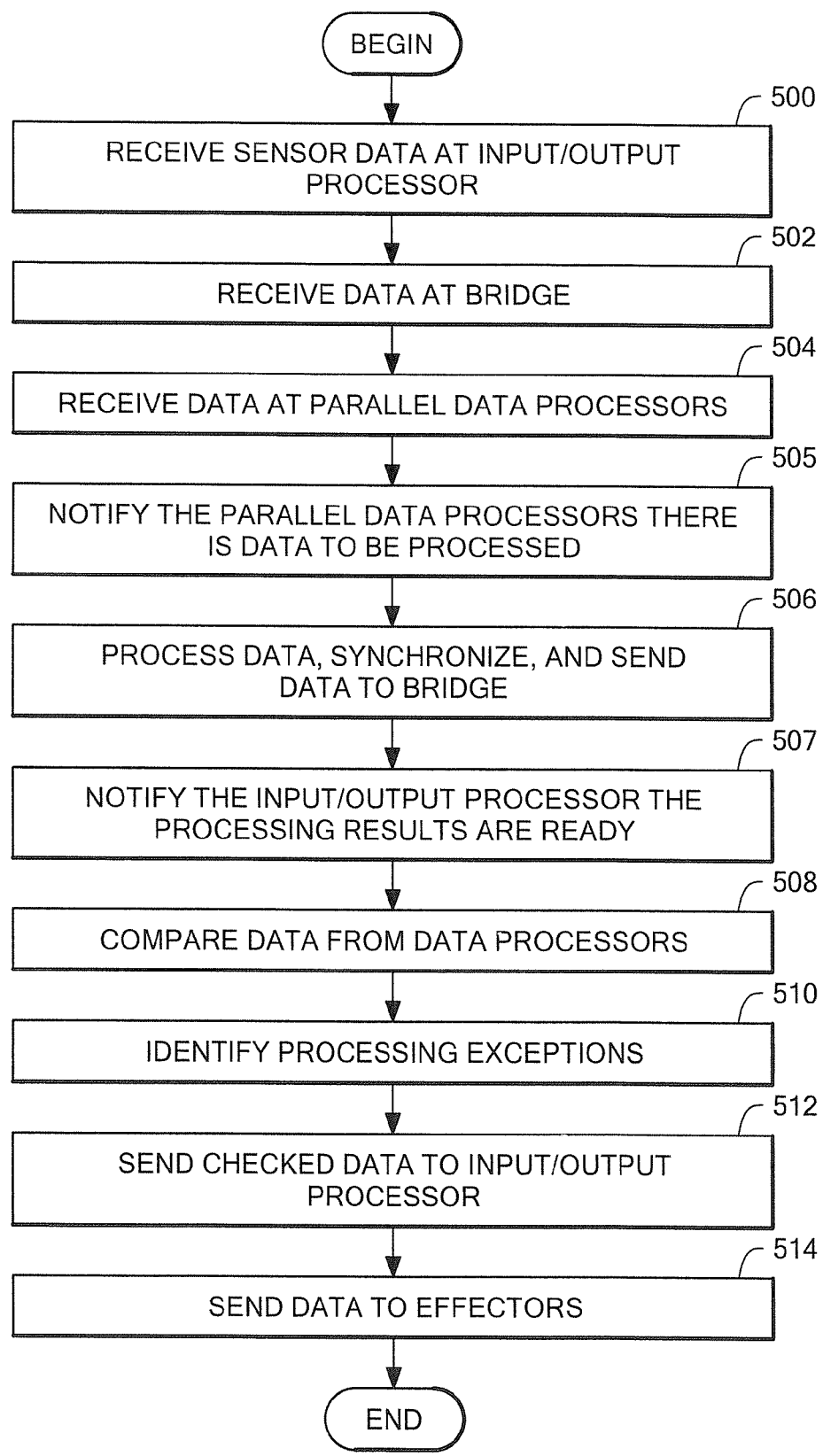
FIG. 8 is a flow diagram of an exemplary sequence of steps implementing high assurance processing in accordance with the present invention.

FIG. 8 shows an exemplary sequence of steps implementing high assurance processing in accordance with the present invention. In step 500, sensor data is received by the input/output processor and the data is then received by the bridge in step 502. The data from the bridge is received at the parallel data processors in step 504. In step 505 the input/output processor uses a semaphore to notify the parallel data processors there is data to be processed. In step 506, the sensor data is processed in parallel by the data processors to generate instructions for one or more effectors. The sensors can provide for example, navigation information for an aircraft and the effectors can manipulate aircraft components to achieve a desired heading, for example. In step 507 the parallel data processors use a semaphore to notify the input/output processor the processing results are ready.

In step 508, data from the parallel data processors is compared to identify faults. If zero, or a predetermined number, of data matches are not found, in one embodiment a processing exception is generated in step 510 to prevent an effector from taking an action of unacceptable safety risk. In step 512, the checked data is sent from the bridge to the input/output processor and in step 514, the data is sent from the bridge to the effectors.

As discussed above, the inventive high assurance system can use COTS processor modules and open standard bus interfaces. The bridge can be implemented as an active backplane with COTS processor cards or as a standard compliant carrier card with COTS processor mezzanine modules as data processors to maximize the utilization of COTS products. This can be a significant benefit in reducing life cycle costs. For example, it is not necessary to incur the expense of developing custom complex processor modules because this approach makes use of COTS processor modules. In addition, it is possible to have a technology refresh of the COTS processor modules without impact on the implementation of the integrity critical bridge function. This benefit can be significant because the technology cycle for changes in open standard bus technology is longer than the cycle for processing chip and module technology. It is also common industry practice to make new COTS modules backwards compatible with previous versions of an open standard bus so even if there is a new version of an open standard bus it is still practical to be using an older version.

While the probability of a fault having hazardous effects may be remote, the consequences of a hazardous result makes it imperative to limit the exposure the system has to faults. One way of limiting exposure is to continuously or periodically check for faults. In accordance with the present invention, the comparison and voting logic is continuously checking data from the data processors to ensure data corrupted by a fault is not used in a way that could have hazardous consequences. This benefit might be nullified if there were a fault in the comparison and voting logic itself. This invention includes a mechanism that supports periodic testing of comparison and voting logic to ensure the integrity of the comparison and voting logic. These tests can be interspersed with the normal operational access to minimize impact on the processing timeline and achieve nearly continuous verification of those critical functions.

Some prior approaches to high assurance processing require multiple processors with synchronized clocks to facilitate cycle-by-cycle voting. Having loosely synchronized processors, as described above in an exemplary embodiment, may eliminate a common clock as a potential single point of failure and facilitates the use of COTS processor modules with independent internal oscillators.

Safety critical software requires a high degree of documentation and testing to provide adequate assurance there are not errors or deficiencies in the design or implementation that could pose a threat to safe operation. This level of scrutiny may result in significant maintenance costs for changes in safety critical software. In one aspect of the invention, safety critical mechanisms are hosted in the data processors and isolated from changes to top level processing system interface changes by the input/output processor.

Since the inventive high assurance bridge conforms to open standards for bus bridging in exemplary embodiments, the operation of the comparison and voting logic is largely transparent to the other hardware and software within the processing system. Data transfers between the input/output processor and the parallel data processors occur in a way that looks the same as an input/output processor communicating with a single data processor but for the checks that go on in the data transfer and voting function. Initial software development and hardware integration can be performed with an input/output processor and a single data processor on a common bus or two buses bridged by a conventional bus bridge. The number of data processors is also virtually transparent to the application software so changes to the amount of redundancy can be accommodated without changing the safety critical application software.

For ease of explanation and clarity, the above description addressed exemplary methods and apparatus configuring and applying the various aspects of this invention. It will be readily apparent that there are many other ways the inventive system could be configured or applied.

While the system of FIG. 1 depicts a system with dual redundant processing at the processing system level, it is understood that if the reliability of the non-redundant portions of the processing system, such as the input/output processor and high assurance bridge, are sufficient to meet the system level availability and continuity requirements, it may not be necessary to have a redundant processing system as illustrated.

In addition, FIGS. 2-6 depict a configuration with triple modular redundancy of the data processors. However, the redundancy level can vary to meet the needs of a particular application. Generally, at least two data processors enable the voting logic to be effective. Embodiments of the invention support any number of data processors equal to or greater than two. The logic depicted in FIG. 6 will change depending on how many data processors are supported. With N data processors it is necessary to have read-back buffers 384*a-c* for N−1 of them since at least one pair of data needs to match for it to be valid. The number of comparators 382*a-c* can be tailored for the specific system needs. With N data processors there must be at least N/2 comparators since every data processor needs to be compared with at least one other data processor. For maximum flexibility each of N data processors should be compared with all N−1 of the other data processors for a maximum of N(N−1)/2 comparators.

It is understood that the inventive high assurance system can be expanded from a single COTS processor module on each of the data processor buses to include many combinations of open standard bus compliant modules on the parallel data processor buses. Additional modules would work the same way as the data processor with like modules on each bus all accessed in parallel from the input/output processor side of the high assurance bridge. There can also be any combination of open standard bus compliant modules on the input/output processor bus.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A vehicle, comprising:
a high assurance bridge;
a plurality of data processors coupled in parallel to the high assurance bridge; and
an input/output processor coupled to the bridge, the input/output processor adapted to be coupled to a sensor and an effector;
wherein sensor data passes to the bridge through the input/output processor for processing by the plurality of data processors, which generate redundant effector data for comparison by the bridge to detect errors and transmission to the effector.

2. The vehicle according to claim 1, wherein the bridge includes a synchronization module to synchronize data processing by the plurality of data processors.

3. The vehicle according to claim 2, wherein the synchronization module includes semaphore bits.

4. The vehicle according to claim 1, wherein the bridge includes a data transfer and voting module to control data transfer between the input/output processor and the plurality of data processors.

5. The vehicle according to claim 4, wherein the data transfer and voting module includes a series of comparators to compare data from the plurality of data processors for identifying errors.

6. The vehicle according to claim 1, wherein the sensor includes a plurality of navigational sensors.

7. The vehicle according to claim 6, wherein the effector includes at least one mechanism to control an aircraft.

8. The vehicle according to claim 1, wherein the input/output processor and/or the data processors are commercial off the shelf processors.

9. The vehicle according to claim 8, wherein at least one bus connected to the bridge is an open standard bus interface.

10. The vehicle according to claim 1, wherein the vehicle is an aircraft.

11. The vehicle according to claim 1, wherein the vehicle is a ship.

12. The vehicle according to claim 1, wherein the vehicle is a submarine.

13. An aircraft, comprising:
a high assurance bridge;
a plurality of data processors coupled in parallel to the high assurance bridge; and
an input/output processor coupled to the bridge, the input/output processor adapted to be coupled to a sensor and an effector;
wherein sensor data passes to the bridge through the input/output processor for processing by the plurality of data processors, which generate redundant effector data for comparison by the bridge to detect errors and transmission to the effector.

14. The aircraft according to claim 13, wherein the bridge includes a synchronization module to synchronize data processing by the plurality of data processors.

15. The aircraft according to claim 13, wherein the bridge includes a data transfer and voting module to control data transfer between the input/output processor and the plurality of data processors.

16. A vehicle, comprising:
a plurality of data processors coupled in parallel;
a bridge coupled to the plurality of data processors, the bridge including a synchronization module and a data transfer and voting module; and
an input/output processor coupled to the bridge, the input/output processor adapted to be coupled to a sensor and an effector;
wherein sensor data passes to the bridge through the input/output processor for processing by the plurality of data processors, which generate redundant effector data for comparison by the bridge to detect errors and transmission to the effector.

17. The vehicle according to claim 16, wherein the bridge is capable of performing a given number of successful comparisons for the sensor data to meet an assurance requirement.

18. The vehicle according to claim 16, wherein a first one of the plurality of data processors can be ignored.

19. The vehicle according to claim 16, wherein the bridge generates bus exception to the input/output processor when the comparison is unsuccessful.

20. The vehicle according to claim 16, wherein the data transfer and voting module includes a series of comparators to compare data from the plurality of data processors for identifying errors.

* * * * *